United States Patent
Mixon et al.

(10) Patent No.: US 10,525,801 B1
(45) Date of Patent: Jan. 7, 2020

(54) SUNROOF ADJUSTABLE HOUSING

(71) Applicant: Aisin Technical Center of America, Inc., Northville, MI (US)

(72) Inventors: Michael Mixon, Northville, MI (US); Shintaro Katsura, Northville, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 0 days.

(21) Appl. No.: 16/115,735

(22) Filed: Aug. 29, 2018

(51) Int. Cl.
*B60J 7/02* (2006.01)
*B60J 7/043* (2006.01)

(52) U.S. Cl.
CPC ............. *B60J 7/022* (2013.01); *B60J 7/043* (2013.01)

(58) Field of Classification Search
CPC .................................. B60J 7/043; B60J 7/022
USPC ............................................ 296/216.01–224
See application file for complete search history.

(56) References Cited

U.S. PATENT DOCUMENTS

| | | | |
|---|---|---|---|
| 5,104,178 A | 4/1992 | Bienert | |
| 6,196,625 B1 * | 3/2001 | Nagashima | B60J 7/022 296/213 |
| 8,029,052 B2 | 10/2011 | Kadzban et al. | |
| 8,292,359 B2 | 10/2012 | Maruyama et al. | |
| 2012/0032476 A1 * | 2/2012 | Hirata | B60J 7/04 296/216.04 |

FOREIGN PATENT DOCUMENTS

| | | |
|---|---|---|
| CN | 206623663 U | 11/2017 |
| EP | 1318039 A1 | 6/2003 |
| JP | 2007-137205 | 6/2007 |

* cited by examiner

*Primary Examiner* — Dennis H Pedder
(74) *Attorney, Agent, or Firm* — Oblon, McClelland, Maier & Neustadt, L.L.P.

(57) ABSTRACT

A sunroof apparatus for an automotive vehicle having a roof is disclosed. The sunroof apparatus includes a movable panel, a pair of guide rails extending along a length direction of the vehicle, a housing mounted to the roof and supporting the movable panel, and tubes. The housing is a split housing structure including a first housing panel and a second housing panel. A first pair of tubes are connected in a slideable manner to the first housing panel and a second pair of tubes are connected in a slideable manner to the second housing panel. The first housing panel and the second housing panel are moved by sliding them along the tubes away from each other to align outer edges of the first housing panel and the second housing panel with respective guide rails.

6 Claims, 2 Drawing Sheets

SUNROOF ADJUSTABLE HOUSING

BACKGROUND

Field of the Disclosure

The present disclosure is directed towards an adjustable housing for a vehicle sunroof.

Description of the Related Art

The "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

Automotive vehicles may be provided with a sunroof or moonroof in the roof of the passenger compartment. A sunroof or moonroof assembly may include one or more glass panels in a window assembly, and a housing assembly. In the case of a sunroof assembly, an opening mechanism may also be included. The window assembly may include a movable glass panel and a fixed glass panel, or may include just a movable glass panel. The movable glass panel opens and closes a substantially rectangular opening within the housing assembly. The housing assembly in turn is mounted to an opening in the vehicle roof. Sunroofs are available in many sizes. For example, a panoramic sunroof is displayed over the entire roof and has a movable glass panel that retracts. Moving the movable glass panel to the open position allows fresh air into the passenger compartment.

The housing assembly for a sunroof or moonroof assembly typically includes a single frame structure. The housing assembly extends along a front-rear direction of the vehicle which may be referred to as a length direction. The width direction of the housing is along the vehicle width direction. Because different vehicles have various widths and due to variations during manufacturing, the sunroof or moonroof may vary in size in the width of the housing frame. Subsequently, a different housing is required for each width of the sunroof. For example, large injection pieces have trouble keeping tight tolerances over long distances due to material shrink, warp, and other distortions. Also, slight variation in width of a sunroof assembly can lead to problems in obtaining proper alignment within the opening of a vehicle roof.

These and other problems are addressed by the disclosure.

SUMMARY

The present disclosure relates to A sunroof apparatus for an automotive vehicle having a roof with a substantially rectangular opening, including a movable panel, a pair of guide rails extending along a length direction of the vehicle and positioned in opposing edges of the opening, and a housing mounted to the roof and supporting the movable panel. The housing including a first housing panel and a second housing panel, the first housing panel being arranged in association with one of the guide rails and the second housing panel being arranged in association with another of the guide rails. The sunroof apparatus further including a plurality of pairs of tubes. A first pair of tubes are connected in a slideable manner to the first housing panel and a second pair of tubes are connected in a slideable manner to the second housing panel. One of the first pair of tubes are guided to an outer edge of the first guide rail and another of the first pair of tubes are guided to an outer edge of the second guide rail. One of the second pair of tubes are guided to the outer edge the first guide rail and another of the second pair of tubes are guided to the outer edge of the second guide rail. The first housing panel and the second housing panel are moved by sliding along the tubes away from each other to align outer edges of the first housing panel and the second housing panel with the first guide rail and the second guide rail, respectively.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
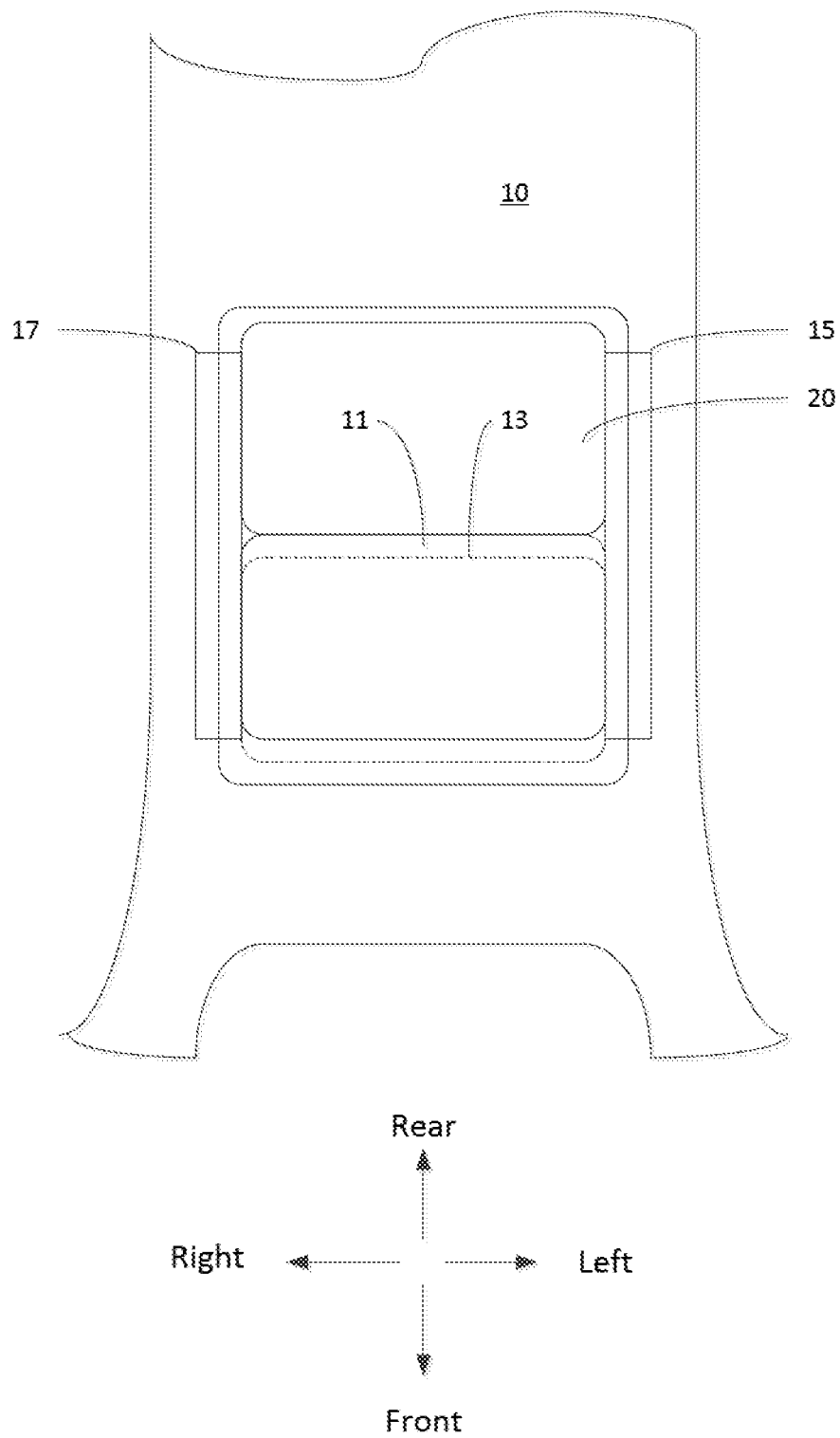
FIG. 1 is a schematic plan view of a sunroof apparatus for a vehicle according to an exemplary aspect of the disclosure.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first." "second," "third," etc., merely identify one of a number of portions, components, points of reference, operations and/or functions as described herein, and likewise do not necessarily limit aspects of the disclosed subject matter to any particular configuration or orientation.

Referring now to the drawings, wherein like reference numerals designate identical or corresponding parts throughout several views, the following description relates to a sunroof assembly for an automotive vehicle. Automotive vehicles may provide sunroof assemblies of various sizes which can require a different housing for each sunroof size and can lead to difficulty in alignment of a sunroof assembly due to variation in dimensions. Disclosed are embodiments that provide a solution to these problems. The disclosed invention provides a solution that accommodates for various sunroof sizes and variations due to manufacturing capabilities.

A sunroof apparatus of a vehicle roof 10 will be explained. However, the disclosure may apply as well to a moonroof apparatus. Hereinafter, a front/rear direction refers to a forward/rearward direction relative to a traveling direction of the vehicle having the roof 10. A right/left direction or a width direction refers to a direction of the vehicle when the vehicle is traveling forward. FIG. 1 is a schematic plan view of a sunroof apparatus for a vehicle according to an exemplary aspect of the disclosure. The sunroof apparatus includes a movable glass panel 11 that can move to a closed position over opening portion 13. The sunroof apparatus includes a fixed glass panel 20. The fixed glass panel 20 and movable glass panel 11 may both be of the same material. The material of the fixed glass panel 20 and the movable glass panel 11 may be opaque or transparent, and may include a safety glass having a plastic coating. The movable glass panel may be either manual or electric operated.

A pair of guide rails 15, 17 are provided at left side and right side edge portions of the opening portion 13. The guide rails 15, 17 are fixedly attached to the roof 10. Each of the guide rails 15, 17 includes a uniform cross section that is perpendicular to a longitudinal direction thereof (the front/rear direction of the vehicle). The cross sections of the guide rails 15, 17 are symmetrical to each other in the width direction of the vehicle. The guide rails 15, 17 may be formed from an extruded light metal material including aluminum alloy but not limited thereto.

Figure 2:
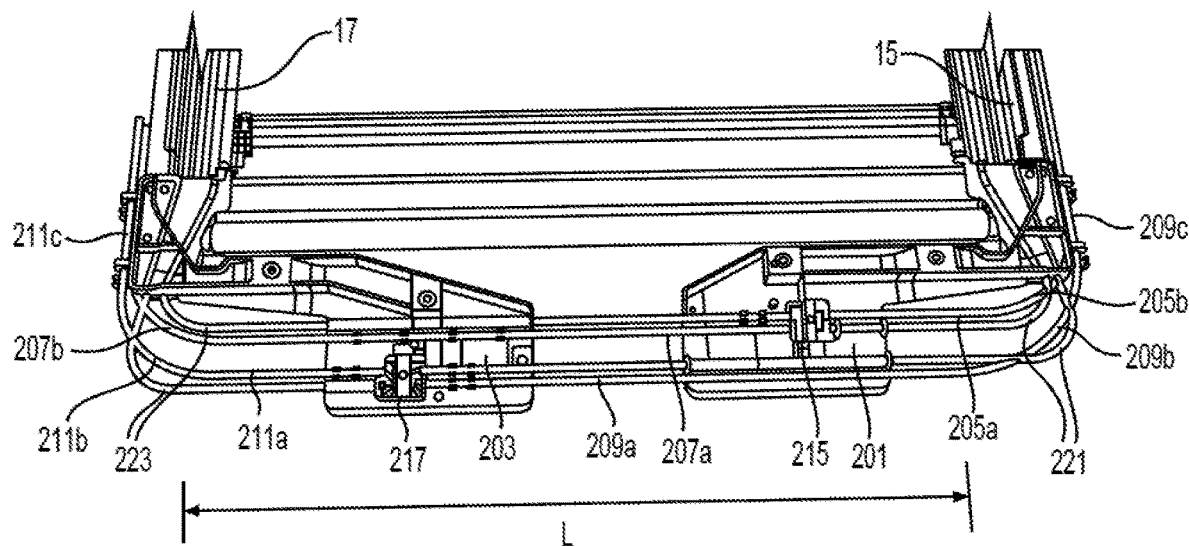
FIG. 2 is a partial view of the sunroof apparatus according to an exemplary aspect of the disclosure.

FIG. 2 is a partial view of a housing assembly of the sunroof apparatus according to an exemplary aspect of the disclosure. The housing assembly includes a width-adjustable housing that uses metal pipes to allow change in the width direction of the sunroof apparatus. In one embodiment, the housing assembly includes a divided structure having a first housing portion 201 and a second housing portion 203. Each housing portion 201 and 203 is positioned at an end of a respective guide rail 15 and 17, respectively. The housing portions 201 and 203 are preferably attached to the roof of the vehicle using bolts. These bolts are not visible from outside or inside the vehicle. The housing portions 201 and 203 may be made of a light metal material having a peripheral wall to form a shallow hollow area where resin pipes including wiring may be routed. The housing portions 201 and 203 are symmetrical L-shaped panel structures. The L-shaped structure is such that one leg is along the width direction and another leg extends toward the forward direction. A width of the leg that extends toward the forward direction is about half of the length of the leg that runs along the width direction. The leg that runs along the width direction extends from the outer edge of the respective guide rail towards the center line axis between the guide rails 15, 17 and separated from the comparable leg of the other housing portion by a predetermined distance. The forward extended panels of each housing portion 201, 203 has a clamp 215, 217, each having at least two circular openings to accommodate circular tubes, referred to herein as pipes. Each clamp 215, 217 is mounted at a different position offset from each other relative to the forward direction. The forward extending panels of each housing portion extends by a length in the forward direction that is enough to accommodate four spaced apart pipes. The housing portions 201 and 203 also each include an arm that extends from the leg that is arranged in the width direction to an end of a respective guide rail.

In one embodiment, a pair of opposing metal pipes 205 (205a, 205b, 205c), 207 (207a, 207b, 207c) are inserted into respective separate circular openings of clamp 215 of the first housing portion 201. Metal pipe 205a is fed through a clamp 215 opening from the direction of guide rail 15 in the width direction, while metal pipe 207a is fed through a clamp 215 opening from the direction of guide rail 17 in the width direction. Another pair of opposing metal pipes 209 (209a, 209b, 209c), 211 (211a, 211b, 211c) are inserted into respective separate circular openings of clamp 217 of the second housing portion 203. Metal pipe 211a is fed through a clamp 217 opening from the direction of guide rail 17 in the width direction, while metal pipe 209a is fed through a clamp 217 opening from the direction of guide rail 15 in the width direction. Each of the metal pipes 205a, 207a, 209a, and 211a can slide in their respective clamp opening to allow adjustment of the position of each housing portion 201 and 203 in the width direction. Once adjusted to a desired position, the clamps 215 and 217 may be tightened to hold the metal pipes in place. Tightening of the clamps 215 and 217 may be by way of a screw or bolt, or other equivalent fastening device. Alternatively, clamp openings and metal pipes may be configured to allow only one-way movement, such as with openings having triangular teeth. In some embodiments, clamps 215 and 217 may be of a type of plastic material in which the openings can hold the metal pipes by friction.

The metal pipes 205, 207, 209, and 211 may be hollow to accommodate insulated wires. Also, resin pipes 221, 223 may be included as a drive wire path. The resin pipes 221, 223 may be routed through the shallow area of each housing portion 201, 203 into guide rails 15, 17. To change the width of the housing, all that is needed is to replace metal pipes 205a, 207a, 209a, 211a with pipes of different lengths L. Also, the position of each housing portion 201, 203 can be individually adjusted along the metal pipes. This fine adjustment allows for accurate alignment of the housing portions 201, 203 in the width direction.

Figure 3:
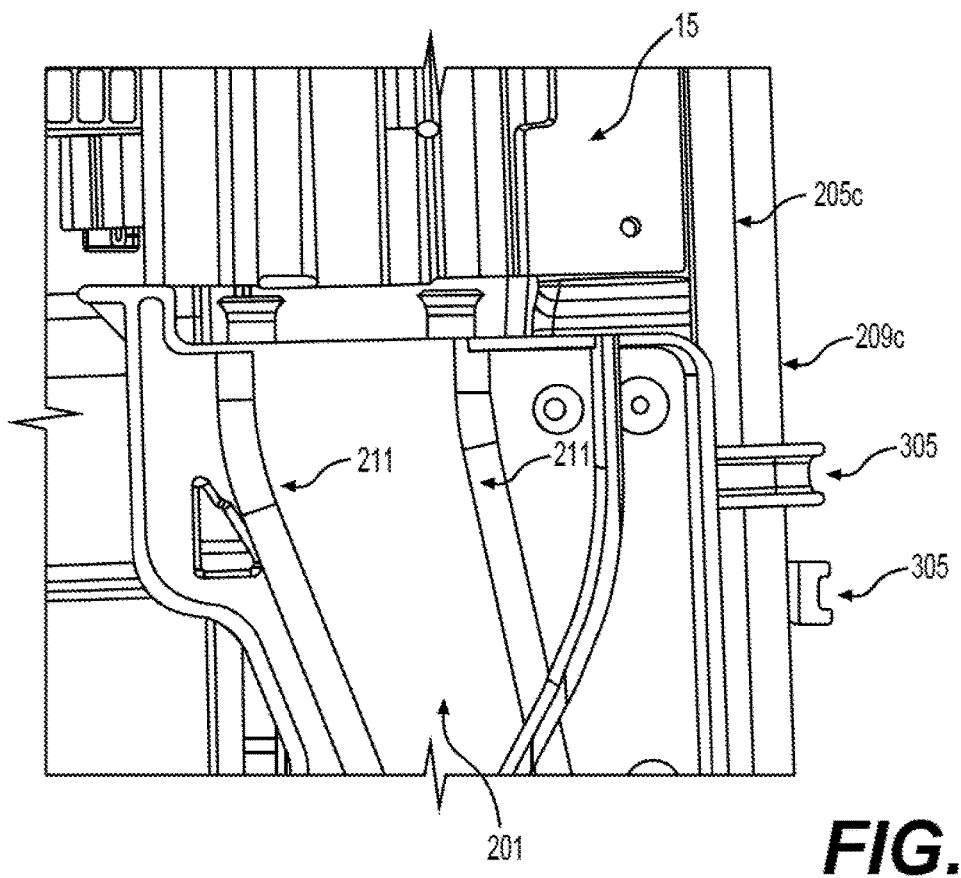
FIG. 3 is another partial view of the sunroof apparatus according to an exemplary aspect of the disclosure.

FIG. 3 is another partial view of the sunroof apparatus according to an exemplary aspect of the disclosure. FIG. 3 shows the arm of housing portion 201. Each of the metal pipes includes substantially straight sections 205a, 207a, 209a, 211a in the width direction. The metal pipes include a curved section 205b, 207b, 209b that curves about 90 degrees from the straight section to the outer edge of one of the guide rails 15 or 17. Regarding FIG. 3, the metal pipes 205 and 209 include another straight section 205c. 209c that extends in the backward direction along an outer edge of the arm of the housing portion 201 and continues along an outer edge of guide rail 15. The outer edge of the arm of the housing portion 201 that follows the backward direction includes one or more guide hooks 305 to guide the metal pipes 205c and 209c along the outer edge of the housing portion 201 and toward the outer edge of the guide rail 15. In a similar manner, the metal pipes 207c (Not Shown) and 211c extend along an outer edge of the arm of the housing portion 203 then continues along an outer edge of guide rail 17. The outer edge of the arm of the housing portion 203 includes one or more guide hooks 305 to guide the metal pipes 207c and 211c along the outer edge of the housing portion 203 and toward the outer edge of the guide rail 17. With this arrangement, the housing portions 201 and 203 can be positioned to align with the outer edge of respective guide rails 15 and 17.

Each of the component parts of the housing portions 201, 203 including clamps 215, 217, and 305 may be made of a light metal, such as aluminum. However, other materials may be used for the component parts. In some embodiments, the clamps 215, 217, and 305 may be made of a plastic that has at least some flexibility, but enough strength to hold the metal pipes.

To accommodate for different vehicle sizes that have variation in width direction, all that is needed is to replace metal pipes 205a, 207a, 209a, 211a with pipes of different lengths L. To accommodate for variation that can occur due to difficulties in injection of large parts, the pipe can accept variation, and after being attached to the other side housing, the pitch can be accurately set without additional binding.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

What is claimed is:

1. A sunroof apparatus for an automotive vehicle having a roof with a substantially rectangular opening, comprising:
    a movable panel;
    a pair of guide rails extending along a length direction of the vehicle and positioned in opposing edges of the opening;
    a housing mounted to the roof and supporting the movable panel;
    the housing including a first housing panel and a second housing panel, the first housing panel being arranged in association with one of the guide rails and the second housing panel being arranged in association with another of the guide rails;
    a first pair of tubes connected in a slideable manner to the first housing panel and a second pair of tubes connected in a slideable manner to the second housing panel;
    wherein one of the first pair of tubes curve toward an outer edge of the first guide rail and another of the first pair of tubes curve toward an outer edge of the second guide rail,
    wherein one of the second pair of tubes curve toward the outer edge the first guide rail and another of the second pair of tubes curve toward the outer edge of the second guide rail,
    wherein the first housing panel and the second housing panel are moved by sliding them along the tubes away from each other to align outer edges of the first housing panel and the second housing panel with the first guide rail and the second guide rail, respectively.

2. The sunroof apparatus of claim 1, wherein the first pair of tubes and the second pair of tubes are hollow metal tubes.

3. The sunroof apparatus of claim 1, further comprising a first clamp mounted to the first housing and a second clamp mounted to the second housing,
    wherein the first pair of tubes are connected to the first housing by passing through an opening in the first clamp, and
    wherein the second pair of tubes are connected to the second housing by passing through an opening in the second clamp.

4. The sunroof apparatus of claim 1, further comprising a pair of side clamps mounted to the outer edges of each of the first and second housing, wherein the pair of side clamps hold respective tubes in place in order to align the first housing with the first guide rail and the second housing with the second guide rail.

5. The sunroof apparatus of claim 1, wherein the first housing and the second housing each include an arm that extends toward an end of the first guide rail and an end of the second guide rail, respectively.

6. The sunroof apparatus of claim 1, wherein the first housing and the second housing each include a shallow section for routing hollow resin tubes into ends of the guide rails.

* * * * *